United States Patent [19]
Ort et al.

[11] 3,732,058
[45] May 8, 1973

[54] APPARATUS FOR IGNITING PERCUSSIVELY OR ELECTRICALLY FIREABLE FLASH UNITS

[75] Inventors: Wolfgang Ort, 7 Stuttgart 1; Gerhard Brauning, 7050 Waiblingen, both of Germany

[73] Assignee: Eastman Kodak Company, Rochester, N.Y.

[22] Filed: June 1, 1970

[21] Appl. No.: 148,357

[30] Foreign Application Priority Data

June 13, 1970 Germany.....................P 20 29 231.3
July 31, 1970 Germany.................P 20 38 113.9
Aug. 29, 1970 Germany................G 70 32 349.8

[52] U.S. Cl.......................431/93, 95/11 L, 95/11.5, 240/1.3
[51] Int. Cl................................F21k 5/02
[58] Field of Search...........................431/92, 93, 95; 95/11, 11.5, 11 L; 240/1.3

[56] References Cited

UNITED STATES PATENTS

| | | | |
|---|---|---|---|
| 2,972,937 | 2/1961 | Suits | 431/95 UX |
| 3,454,755 | 7/1969 | Wick et al. | 240/1.3 |
| 3,590,706 | 7/1971 | Millet | 431/93 |
| 3,609,334 | 9/1971 | Iwaki | 240/1.3 |

*Primary Examiner*—Carroll B. Dority, Jr.
*Attorney*—W. H. J. Kline and Leonard W. Treash, Jr.

[57] ABSTRACT

Photographic apparatus which can receive and actuate both percussively and electrically fireable flash units has percussive firing means and piezoelectric firing means selectively actuable in response to application of the same actuating force. Disclosed structure includes a blocking lever for disabling either the percussive firing means or the piezoelectric firing means in response to receipt of the other type of flash unit.

In another embodiment, means are included for simultaneously firing both types of flash units.

In another embodiment, the piezoelectric firing means is operable when there is either no percussively fireable flash unit present or a previously fired percussively fireable unit is present.

In other embodiments, the percussive and piezoelectric firing means, blocking lever and flash actuating means are incorporated within adapters for use with cameras which have no flash capability or which are able to fire only one type of flash unit.

17 Claims, 8 Drawing Figures

WOLFGANG ORT
GERHARD BRAUNING
INVENTORS

BY Leonard W. Treash, Jr.

W. H. J. Kline
ATTORNEYS

WOLFGANG ORT
GERHARD BRAUNING
INVENTORS

WOLFGANG ORT
GERHARD BRAUNING
INVENTORS

BY Leonard W. French, Jr.
W. H. J. Kline
ATTORNEYS

WOLFGANG ORT
GERHARD BRAUNING
INVENTORS

BY Leonard W. Trash, Jr.

H.H.J. Kline
ATTORNEYS

APPARATUS FOR IGNITING PERCUSSIVELY OR ELECTRICALLY FIREABLE FLASH UNITS

CROSS-REFERENCE TO RELATED PATENT APPLICATION

Reference is made to copending, commonly assigned, U.S. Pat. Application Ser. No. 9,209 filed Feb. 6, 1970, now U.S. Pat. No. 3,672,813 and entitled ADAPTER FOR IGNITING ELECTRICALLY IGNITABLE FLASHLAMPS, filed in the name of William Horton.

BACKGROUND OF THE INVENTION

1. Field of the Invention

The present invention relates to photographic apparatus and in particular to cameras and adapters equipped to receive and fire both percussively and electrically fireable flash units.

2. Description of the Prior Art

U.S. Pat. No. 3,576,155, issued in the name of David Beach on Apr. 27, 1971, describes a new photoflash unit having four percussive flash lamps fireable by striking and a striker for each lamp held in a pre-energized position from which it is releasable to fire its lamp.

U.S. Pat. No. 3,581,637, issued in the name of Donald M. Harvey on June 1, 1971, describes a socket adapted to receive either an electrically actuable flashcube or a percussively actuable flashcube and further describes mechanism to actuate whichever lamp is received.

U.S. Pat. No. 2,972,937, issued in the name of C. G. Suits on Feb. 28, 1961, describes a camera capable of receiving a flash lamp fireable by striking a piezoelectric crystal and further describes a mechanism for effecting such firing.

U.S. Patent Application Ser. No. 9,209, filed in the name of William H. Horton on Feb. 6, 1970, now U.S. Pat. No. 3,672,813 and entitled ADAPTER FOR IGNITING ELECTRICALLY IGNITABLE FLASHLAMPS, discloses an adapter for converting a percussive flash camera of the type described in the above-mentioned U.S. Pat. No. 3,576,155 into apparatus adapted to receive and actuate a piezo fireable lamp either in single lamp form or in multilamp form.

A number of high quality cameras presently on the market provide the versatile feature of more than one type of flash capability by various means; for example, by providing an electric flashcube socket and an accessory shoe for electronic flash. Similarly, adapters have been manufactured for converting from one to another.

SUMMARY OF THE INVENTION

Accordingly, an object of the present invention is to provide photographic apparatus equipped to receive and fire either a percussively fireable flash unit or a piezoelectrically fireable flash unit.

Another object of the invention is to provide such apparatus which can fire either type of flash unit or alternatively can simultaneously fire both types of flash units.

A still further object of the invention is to provide an adapter for photographic apparatus to convert such photographic apparatus to receive and fire either a percussively fireable flash unit or a piezoelectrically fireable flash unit.

To meet these and other objects, the present invention provides photographic apparatus which includes means for receiving and firing both piezoelectrically fireable and percussively fireable flash units. It is a feature of the invention to utilize the force provided from a single source to actuate both units. In one embodiment, insertion of a percussively fireable flash unit rotates a blocking lever to free an actuating member for the percussively fireable unit. Rotation of the blocking lever simultaneously opens a switch to insure that an electrically fireable flash unit will not be activated simultaneously with the percussively fireable flash unit. Means are also provided for closing a second switch to allow simultaneous firing of both types of flash units. In both embodiments means are provided for disabling the percussion striker element to permit firing of the electrically fireable unit in the absence of a percussively fireable unit. Although each of these features gives advantages when used alone, these advantages are multiplied when used in combination.

In an alternative embodiment, an adapter is provided for photographic apparatus which enables the apparatus to receive and fire both percussively fireable and piezoelectrically fireable flash units. The adapter contains a percussion striker element which is freed by insertion of a percussively fireable flash unit for movement against a percussion firing spring and also contains a piezoelectric crystal for generating a voltage pulse for firing an electrically fireable flash unit mounted on the adapter. The firing mechanism may be a cable release operatively coupled to the adapter or alternatively may be coupled to flash unit activating mechanism in the photographic apparatus.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Because photographic apparatus is well known, the present description will be directed in particular to camera elements forming part of, or cooperating more directly with, photographic apparatus in accordance with the present invention. It is to be understood that elements of the photographic apparatus not specifically shown or described may take various forms well known to those skilled in the art.

Figure 1:
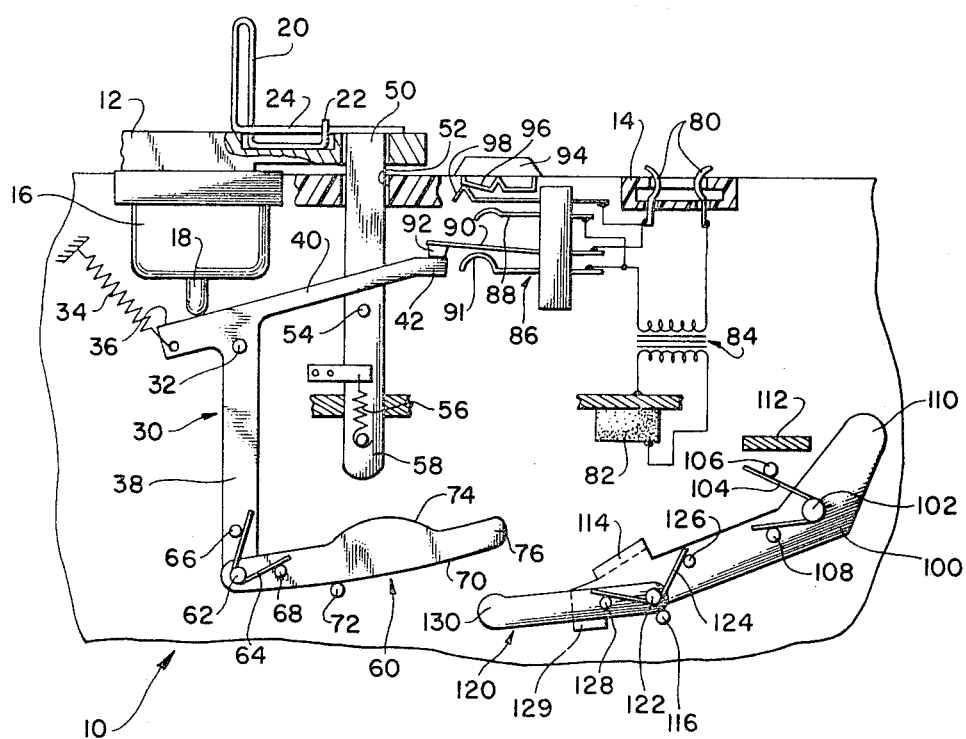
FIG. 1 is a view of a portion of photographic apparatus according to one embodiment of this invention. Portions of the apparatus are removed to reveal the working components of the flash firing mechanism of this embodiment, after insertion of a percussively fireable flash unit in the photographic apparatus.
Figure 2:
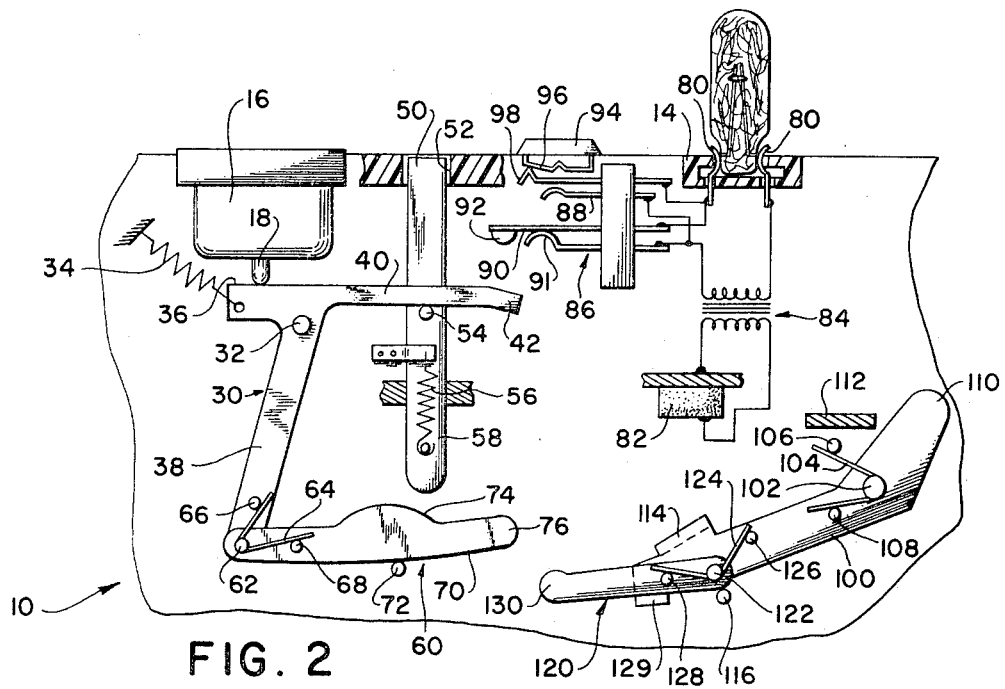
FIG. 2 is a view of the photographic apparatus of FIG. 1 with an electrically fireable flash unit inserted in the apparatus.
Figure 3:
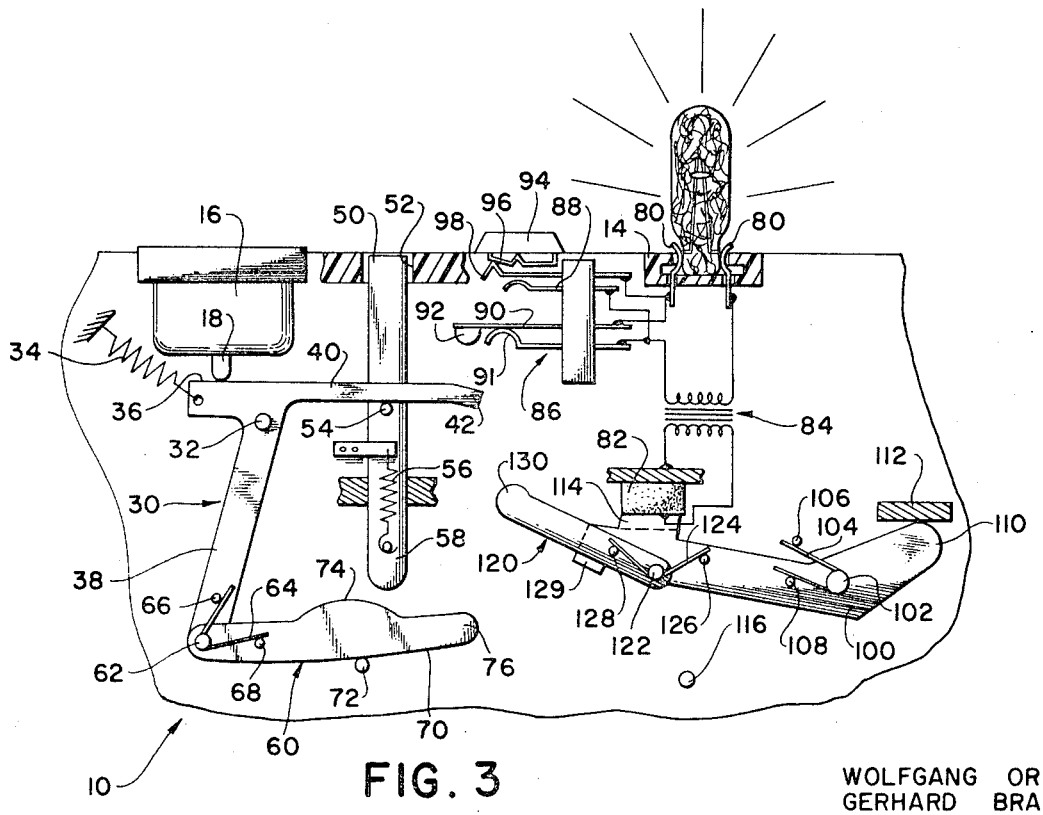
FIG. 3 is a view of the apparatus of FIG. 2 after actuation of the shutter release mechanism of the photographic apparatus, causing firing of the electrically fireable flash unit.

Referring first to FIGS. 1-3, a camera shown generally as 10 is equipped with a socket 12 for receiving a percussively fireable flash unit and a socket 14 for receiving an electrically fireable flash unit. Socket 12 has a base portion 16 with a depending finger 18 extending downwardly from base portion 16, and a percussive firing spring 20. Firing spring 20 is of the kind which has a fixed end 22 held by a portion of socket 12 in a fixed position, with the other spring end 24 of spring 20 being held by fixed end 22 in a cocked firing position. Firing of a flash unit inserted in socket 12 is achieved by raising spring end 24 above fixed end 22, thereby freeing spring end 24 for movement against an igniter element (not shown) of the flash unit.

A blocking lever 30 is rotatably mounted on pivot 32 and is biased in a clockwise direction by spring 34, so that a portion 36 of lever 30 abuts against depending finger 18 of socket 12. Lever 30 includes integrally formed arms 38 and 40, whose function will be described in more detail later.

A firing slide 50 is axially aligned with an aperture 52 in the top surface of camera 10. Firing slide 50 includes an integral blocking pin 54, and slide 50 is biased upwardly by spring 56 so that pin 54 abuts against arm 40 of blocking lever 30 in the absence of a flash unit in socket 12, as may best be seen in FIG. 2. Rotation of blocking lever 30 in a counterclockwise direction under urging of depending finger 18 of socket 12 upon insertion of a flash unit in socket 12 moves arm 40 away from pin 54 and permits firing slide 50 to move upwardly under the bias of spring 56 until slide 50 comes to rest upon spring end 24 of firing spring 20.

A lever 60 is pivotally mounted to arm 38 of blocking lever 30 by a pin 62. Lever 60 is biased in a clockwise direction around a pin 62 by a spring 64 held between a pin 66 on arm 38 and a pin 68 on lever 60, so that a surface 70 of lever 60 rests against a fixed pin 72 in the photographic apparatus. A cam surface 74 is formed on lever 70, adjacent to an end 58 of slide 50, whose function will be explained in more detail later.

A pair of electrical contacts 80 are formed in socket 14 for receipt of an electrical fireable flash unit. A piezoelectric crystal 82 is coupled by means of a transformer 84 and switches 86 and 88 to contacts 80. Switch 86 is in a normally closed position with an arm 90 of switch 86 biased against a contact 91. An ear 92 extends downwardly from arm 90 and is adjacent to but separated from end 42 of arm 40 of blocking lever 30, as may best be seen in FIG. 2. It may be seen that counterclockwise rotation of arm 30 upon insertion of a unit in socket 12 brings end 42 of arm 40 into abutment with ear 92 of arm 90, thereby opening switch 86 and disconnecting the electrical contact 80 of socket 14 from transformer 84. Thus, socket 14 is electrically disabled by insertion of a flash unit in socket 12. Switch 88 is in a normally open position as shown in FIG. 1. A button 94 on camera 10 has an integral cam surface 96 which abuts against an arm 98 of switch 88. Movement of button 94 to the left forces cam surface 96 against arm 98, thereby closing switch 88 and connecting electrical contacts 80 of socket 14 to transformer 84, without regard to the condition of switch 86, for reasons which will be more fully discussed later.

A lever 100 is rotatably mounted on a pin 102 with a return spring 104 held between a fixed pin 106 in the photographic camera 10 and a fixed pin 108 mounted on lever 100. Spring 104 urges lever 100 against a stop 116. A release end 110 on lever 100 is positioned adjacent to a position 112 of the shutter release mechanism of camera 10. The other end of lever 100 is formed with a striker surface 114 which is movable into contact with piezoelectric crystal 82 upon rotation of lever 100. A striker lever 120 is rotatably mounted on lever 100 by a pin 122 and is biased by a spring 124 held between a fixed pin 126 on lever 100 and a pin 128 on lever 120 so that lever 120 rests against a stop 129 on lever 100. Lever 120 has a striker end 130 which is movable into contact with lever 60 upon rotation of lever 100.

In operation, a percussively fireable flash unit is inserted into socket 12 of camera 10, thereby causing depending finger 18 to move downwardly against end 36 of blocking lever 30. Lever 30 is thereby rotated in a counterclockwise direction, moving arm 40 away from pin 54 on firing slide 50 and permitting slide 50 to move upwardly against spring end 24 of firing spring 20. Simultaneously, end 42 of arm 40 abuts against ear 92 of arm 90 of switch 86, thereby opening switch 86, disconnecting contacts 80 from transformer 84 and electrically disabling socket 14. Rotation of lever 30 simultaneously causes movement of lever 60 with surface 70 moving along fixed pin 72 so that cam surface 74 is positioned adjacent to end 58 of firing slide 50. The camera is now in a configuration in which the percussively fireable flash lamp will be fired upon actuation of the shutter release mechanism.

Actuation of the shutter release mechanism of the camera causes movement of portion 112 to the right, abutting upon release end 110 of lever 100 and causing rotation of lever 100 in a clockwise direction about pin 102. Lever 120 moves with lever 100 forcing striker end 130 against an end 76 of lever 60. Rotation of lever 60 about pin 62 carries cam surface 74 into contact with end 58 of firing slide 50, thereby forcing firing slide 50 in an upward direction and moving firing spring 24 above fixed end 22. Firing spring 24 then moves against the igniter element of the flash unit in socket 12, causing firing of the unit in synchronization with opening of the shutter element of camera 10. Simultaneously, striker surface 114 of lever 100 will strike piezoelectric crystal 82, but even if a flash unit is positioned within socket 14 it will not fire because switch 86 is held in an open position by end 42 of arm 40. Upon release of the shutter activating mechanism of camera 10, portion 112 moves to the left, thereby permitting lever 100 to be returned be means of return spring 104 to its initial position abutting fixed pin 116, as shown in FIG. 1.

Operation with an electrically fireable flash unit inserted in socket 14 may best be seen with reference to FIGS. 2 and 3. As no flash unit has been inserted into socket 12, lever 30 is held in its blocking position by means of spring 34. Firing slide 50 is thereby retained within camera 10 by abutment of arm 40 upon pin 54 of firing slide 50. In addition, end 42 of arm 40 is held away from end 92 of arm 90, thereby permitting switch 86 to remain in its normally closed position. Lever 60 is held in the position illustrated in FIG. 2 against pin 72, whereby end 76 of lever 60 is held out of the path of movement of striker end 130 of lever 120.

Actuation of the shutter release mechanism of the camera will cause portion 112 to move to the right, abutting against release end 110 of lever 100 and causing clockwise rotation of lever 100 about pin 102. Striker surface 114 of lever 100 is caused to impinge upon piezoelectric crystal 82, thereby generating a voltage pulse which is transmitted through transformer 84 and switch 86 to electrical contacts 80 of socket 14 and causes firing of the electrically fireable flash unit in socket 14 in synchronization with opening of the shutter element of camera 10. Release of the shutter release mechanism causes return of portion 112 to the left, thereby freeing lever 100 for rotation under bias of spring 104 in a counterclockwise direction until lever 100 returns to its initial position abutting fixed pin 116.

Operation is also possible with both a percussively fired flash unit in socket 12 and an electrically fireable flash unit in socket 14. Button 94 is moved to the left, thereby forcing cam surface 96 against arm 98 and closing switch 88. Operation of the firing mechanism is the same as for a percussively fireable flash unit with rotation of lever 100 causing cam surface 74 of lever 60 to force slide 50 upwardly. Firing spring 24 is thus freed from fixed end 22 for movement against the igniter element of the flash unit in socket 12. Simultaneously, striker surface 114 of lever 100 strikes piezoelectric crystal 82, thereby generating a voltage pulse which is transmitted through transformer 84 and switch 88 to contacts 80 and causes firing of the flash unit in socket 14. Firing of both flash units occurs in synchronization with opening of the shutter element of camera 10.

Figure 4:
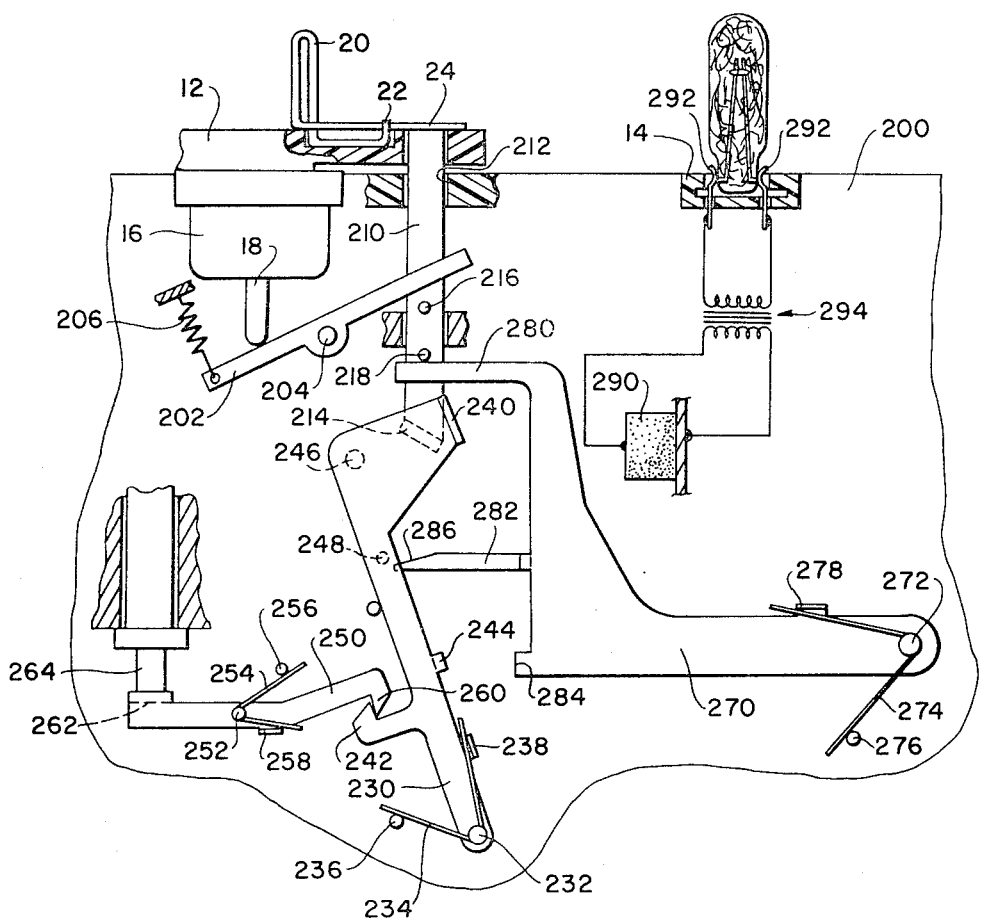
FIG. 4 is a view of another embodiment of photographic apparatus according to this invention. Portions of the apparatus are removed to reveal the working components of the flash firing mechanism of this embodiment, with both a percussively and an electrically fireable flash unit inserted into the photographic apparatus.
Figure 5:
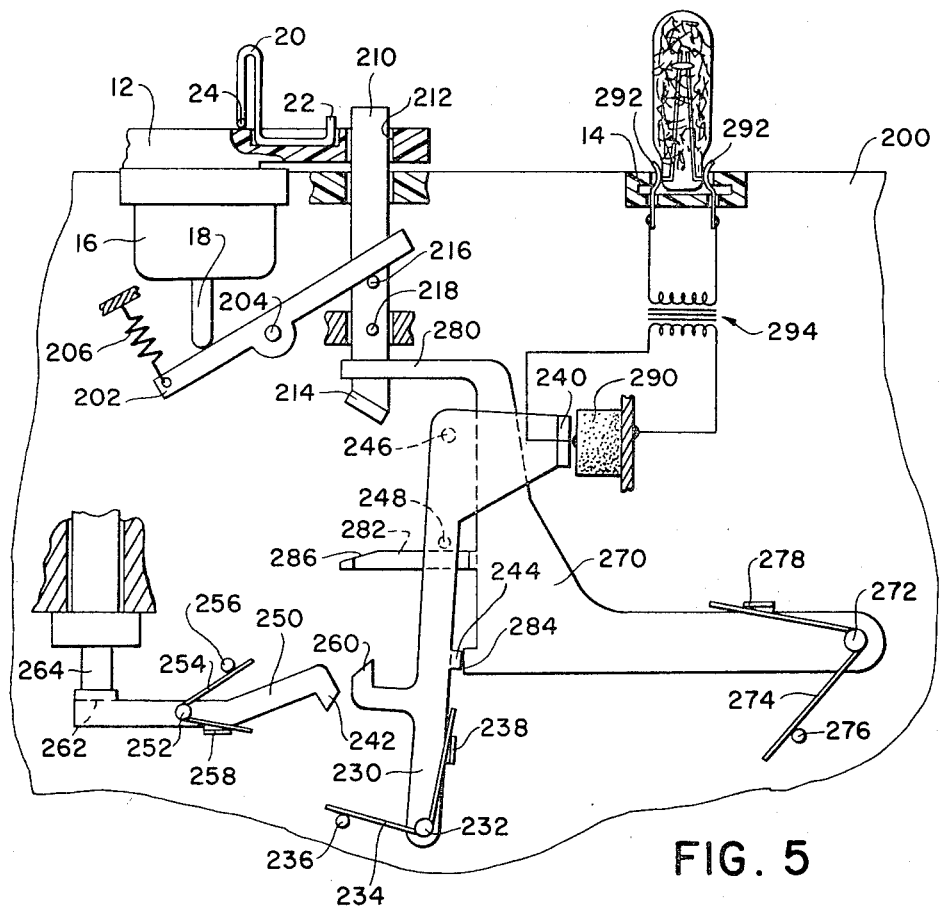
FIG. 5 is a view of the photographic apparatus of FIG. 4, with the percussively fireable flash unit fired and the electrically fireable flash unit in position to be fired.

The embodiment illustrated in FIGS. 4 and 5 has a camera 200 equipped with a socket 12 for a percussively fireable flash unit and a socket 14 for an electrically fireable flash unit, both sockets being the same as in the previous embodiment. Socket 12 has a base 16 with a depending finger 18 associated therewith. The firing mechanism of socket 12 includes a firing spring 20 with a fixed end 22 held by socket 12 and a spring end 24, releasably held by end 22.

Socket 14 has a pair of electrical contacts 292, which are electrically coupled to a piezoelectric crystal 290 through a transformer 294.

A blocking lever 202 is rotatably mounted on a fixed pin 204 and is biased in a clockwise direction by spring 206. A firing slide 210 is axially aligned with an aperture 212 in the top surface of camera 200. Slide 210 has a cam surface 214 at its lower end and two fixed pins 216 and 218. Pin 216 is positioned on slide 210 so as to abut against lever 202 when no flash unit is in socket 12 so that slide 210 is held in its lowered position under the bias of spring 206. A lever 230 is rotatably mounted on a pin 232 and is biased in a clockwise direction by a spring 234 held between an arm 238 of lever 230 and a fixed pin 236. Lever 230 has an integral striker surface 240, a catch member 242, a lug 244 and fixed pins 246 and 248, the position and purpose of these elements to be described in more detail later.

A release lever 250 is rotatably mounted on a pin 252 and is biased in a clockwise direction by a spring 254 held between an arm 258 of lever 250 and a fixed pin 256. A catch member 260 of lever 150 is positioned so as to engage catch member 242 of lever 230 and to thereby hold lever 230 in a cocked position as shown in FIG. 4. An end 262 of lever 250 is positioned in abutment with a portion 264 of the shutter release mechanism of the camera.

A lever 270 is rotatably mounted on a pin 272 and is biased in a clockwise direction by a spring 274 held between an arm 278 of lever 270 and a fixed pin 276. Lever 270 has integral arms 280 and 282, and an abutment 284. Arm 282 terminates in a cam surface 286. Arm 280 of lever 270 rests against fixed pin 218 of firing slide 210 and serves to bias slide 210 in an upward direction under the urging of spring 274. However, spring 274 is a relatively weak spring so that slide 210 is held within camera 200 under the urging of spring 206 until a flash unit is inserted in socket 12, thereby unblocking slide 210 by moving lever 202 out of contact with pin 216. Slide 210 may then move upwards under the bias of spring 274 until the upper end of slide 210 rests against spring end 24. Cam surface 286 of arm 282 is positioned so as to engage fixed pin 248 of lever 230 upon rotation of lever 230 under the bias of spring 234. Fixed pin 248 and lever 230 thereby hold lever 270 against rotation under the bias of spring 274 after operation of the shutter release mechanism of the camera. Abutment 284 of lever 270 is positioned in the path of movement of lug 244 of lever 230 as lever 230 rotates in a clockwise direction thereby limiting movement of lever 230 and preventing striker surface 240 from striking piezoelectric crystal 290.

In operation, the camera may be actuated for photoflash use with either a percussively fireable flash unit inserted in socket 12 or an electrically fireable flash unit inserted in socket 14. Insertion of a flash unit into socket 12 causes movement of depending finger 18 downward against lever 202, thereby causing rotation of lever 202 in a counterclockwise direction against the bias of spring 206. Blocking lever 202 is thereby moved out of contact with fixed pin 216, permitting movement of firing slide 210 upwardly under the bias of spring 274 transmitted through arm 280 of lever 270, until firing slide 210 abuts against spring end 24. The apparatus is now in a position for actuation with a percussively fireable flash unit.

Actuation of the shutter release mechanism causes portion 264 to move in a downward direction thereby rotating lever 250 in a counterclockwise direction and disengaging catch member 260 from engagement with catch member 242 of lever 230. Lever 230 is thereby freed to rotate under bias of spring 234 in a clockwise direction, bringing fixed pin 246 into engagement with cam surface 214 on firing slide 210. Continued movement of pin 246 against cam surface 214 as lever 230 rotates causes upward movement of firing slide 210, thereby forcing spring end 24 to rise above fixed end 22 and freeing spring end 24 to strike the primer tube of the percussively fireable flash unit inserted in socket 12. Simultaneously, fixed pin 248 rides against cam surface 286 of arm 282 of lever 270, thereby holding lever 270 against rotation under the bias of spring 274 as firing slide 210 moves in an upward direction. Lever 230 continues to rotate under the bias of spring 234 until lug 244 abuts against abutment 284 of lever 270. It will be seen that striker 240 is thus held away from piezoelectric crystal 290, thereby preventing firing of a flash unit which may be present in socket 14. Release of the shutter release mechanism and upward movement of portion 264 frees lever 250 to return to its initial position under the bias of spring 254 and positions catch member 260 in its engaging position. A cocking mechanism, now shown, can then rotate lever 230 in a counterclockwise direction against the bias of spring 234 until catch member 242 is engaged by catch member 260. Simultaneously, fixed pin 248 is freed from engagement with arm 286 while fixed pin 218 returns to engagement with arm 280, thereby holding lever 270 against rotation under the bias of spring 274. Camera 200 is now in a configuration for actuation of the shutter release mechanism again with synchronous actuation of a flash unit contained in socket 12.

In the absence of a spring end 24 above firing slide 210, because the flash unit in socket 12 has been fired or in the absence of a flash unit in socket 12, the apparatus will automatically fire a flash unit contained in socket 14. In the absence of a spring end 24 above slide 210 and with lever 202 held in its unblocking position by finger 18, lever 270 rotates under the bias of spring 274 so that slide 210 is in its uppermost position as shown in FIG. 5. Arm 282 is now moved into a position so that fixed pin 248 of lever 230 is below cam surface 286 and does not engage cam surface 286 as lever 230 rotates. Similarly, abutment 284 of lever 270 is moved out of the path of travel of lug 244 and thereby does not prevent continued rotation of lever 230. Actuation of the shutter release mechanism and subsequent downward movement of portion 264 will cause rotation in a counterclockwise direction of lever 250. Catch member 260 is thus disengaged from catch member 242 on lever 250, thereby freeing lever 230 for rotation in a clockwise direction under the bias of spring 234. Lever 230 rotates until striker surface 240 abuts against piezoelectric crystal 290 thereby generating a voltage pulse which is transmitted through transformer 294 to electrical contacts 292 in socket 14, causing firing of the electrically fireable flash unit inserted in socket 14 in synchronization with the opening of the shutter of camera 200.

In the absence of a flash unit within socket 12, lever 202 is held in its clockwise position under bias of spring 206, thereby holding slide 210 in its lowermost position by abutment of lever 202 against fixed pin 216 on slide 210. Fixed pin 218 on slide 210 thereby holds lever 270 in its counterclockwise most position against rotation under the bias of spring 274, thereby holding abutment 284 out of the path of movement of lug 244 of lever 230. Actuation of the shutter release mechanism causes rotation of lever 250 thereby disengaging catch member 260 from catch member 242. Lever 230 rotates under the bias of spring 234, with pin 246 passing above surface 214 of slide 210, until striker surface 240 engages piezoelectric crystal 290, thereby generating a voltage pulse for firing of the flash unit in socket 14. Thus, either with no flash unit present in socket 12 or with a fired unit present in socket 12, lever 230 will be permitted to rotate sufficiently to actuate piezoelectric crystal 290 and thereby generate the voltage pulse required to fire an electrically fireable flash unit in socket 14.

Figure 6:
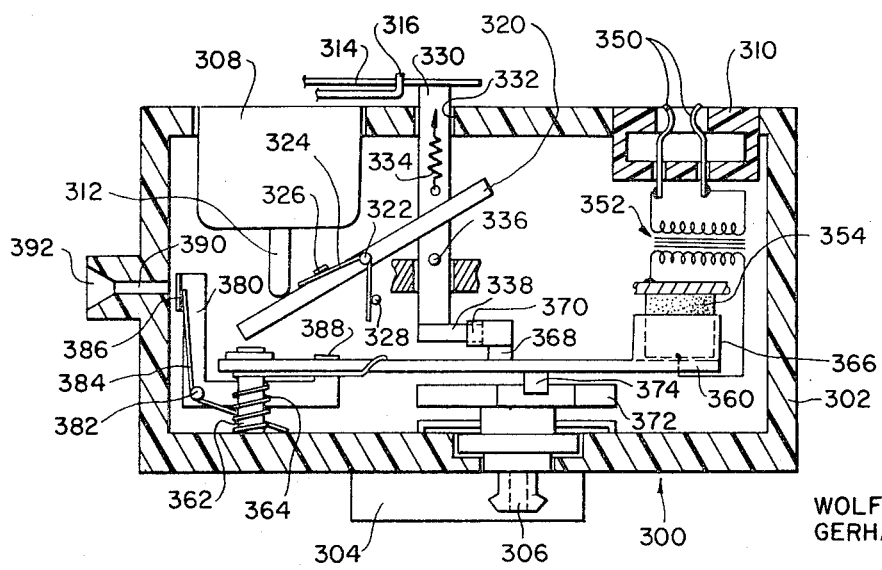
FIG. 6 is a view of an adapter according to one embodiment of this invention. Portions of the adapter are removed to reveal the working components of the embodiment, which is shown with a percussively fireable flash unit inserted in the adapter.
Figure 7:
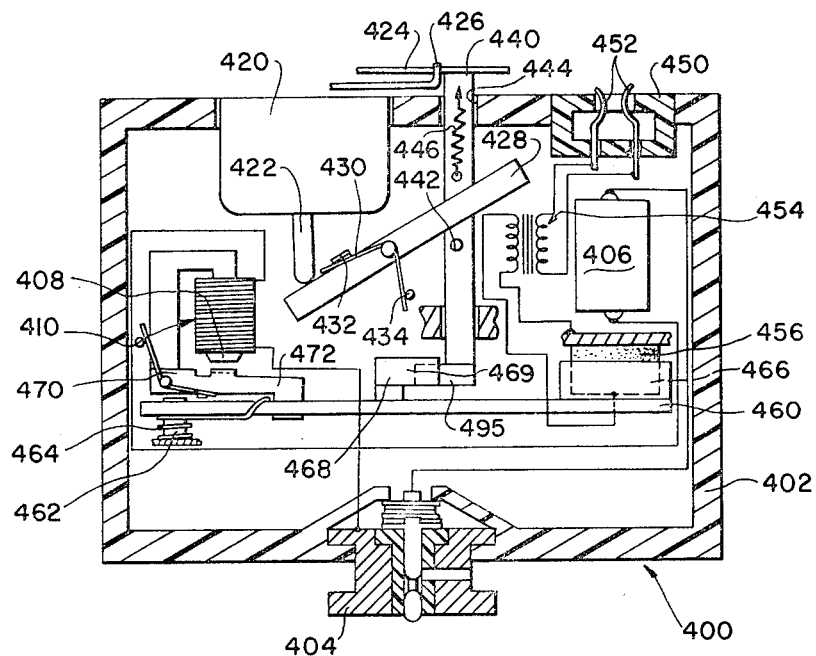
FIG. 7 is a view of an alternative embodiment of an adapter, cut away to reveal the working components of the embodiment, with a percussively fireable flash unit inserted in the adapter.
Figure 8:
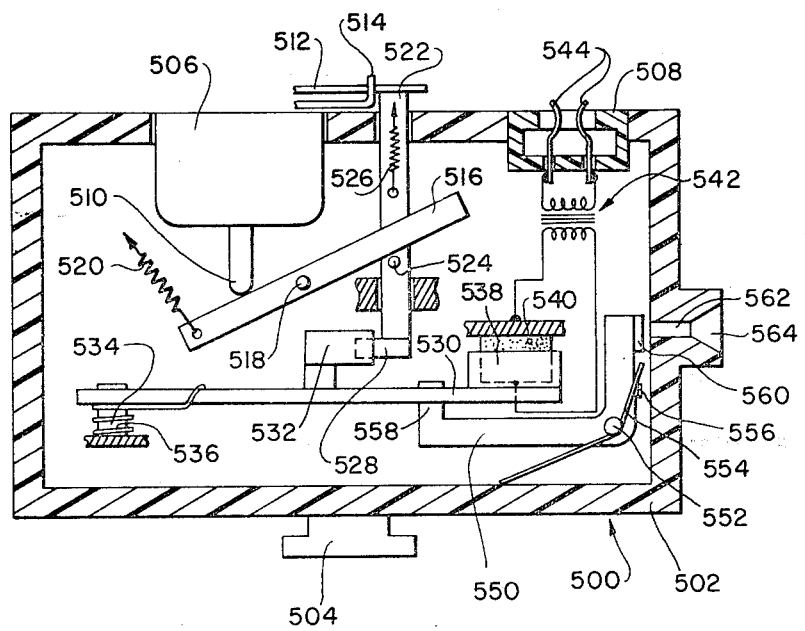
FIG. 8 is a view of still another alternative embodiment of an adapter according to this invention cut away to reveal the working components of the adapter, with a percussively fireable flash unit inserted in the adapter.

FIGS. 6–8 illustrate embodiments of this invention which are adapted for use with photographic cameras which either have no photoflash capability or are equipped for firing only one type of flash unit. As illustrated in FIG. 6, an adapter 300 has a housing 302 with a depending wall 304 which abuts the camera housing and assists in positioning adapter 300 on a camera. Adapter 300 includes a rotatable base 306 which fits into and engages a flashcube socket on a camera, a socket 308 for a percussively fireable flash unit and a socket 310 for an electrically fireable flash unit. Socket 308 has a depending finger 312 extending downwardly from the base of the socket. The firing mechanism of socket 308 includes a firing spring 314 releasably held by a fixed wire 316. Movement of spring 314 above the end of wire 316 frees spring 314 for movement against the primer tube of a flash unit in socket 308.

A blocking lever 320 is rotatably mounted on a pin 322 and is biased in a clockwise direction by a spring 324 held between an arm 326 on lever 320 and a fixed pin 328 so that lever 320 rests against finger 312. A firing slide 330 is axially aligned with an aperture 332 in the top surface of adapter 300 and is biased by a spring 334 in an upward direction. A fixed pin 336 on firing slide 330 engages lever 320 so that slide 330 is held in its downward position in the absence of a flash unit in socket 308. Insertion of a flash unit in socket 308 moves finger 312 downward and rotates lever 320 in a counterclockwise direction, thereby freeing slide 330 for movement upward under the bias of spring 334 until slide 330 rests upon firing spring 314. Socket 310 has a pair of electrical terminals 350 connected to the secondary of a transformer 352, the primary of transformer 352 being connected to a piezoelectric crystal generator 354.

A striker lever 360 is rotatably mounted on a pin 362 and is biased by a spring 364 so that striker 366 abuts against piezoelectric crystal 354. Striker lever 360 has an integral arm 368 which terminates in a cam surface 370 which is positioned adjacent to an end 338 of slide 330. Lever 360 is rotatable against the bias of spring 364 by means of a disc cam 372 which engages a downwardly depending ear 374 of lever 360. Disc cam 372 is coupled to base 306 and rotates therewith as the flashcube socket on the camera rotates, thereby rotating lever 360 against the bais of spring 364. A release lever 380 is rotatably mounted on a pin 382 and is biased in a counterclockwise direction by a spring 384 which is held between an ear 386 of lever 380 and housing 302 of adapter 300. A catch end 388 is movable into the path of lever 360 and serves to hold lever 360 in a cocked position until actuation of the flash mechanism. Ear 386 of lever 380 is aligned with an aperture 390 in housing 302 of adapter 300, through which a cable release wire (not shown) is inserted when a cable release is secured to a socket 392.

In operation, a percussively fireable flash unit is inserted into socket 308, thereby causing depending finger 312 to move downward. Lever 320 is rotated in a counterclockwise direction, thereby freeing slide 330 for upward movement until slide 330 rests against firing spring 314. Actuation of the cable release mechanism causes rotation of lever 380 in a clockwise direction thereby moving catch end 388 away from lever 360 and freeing striker lever 360 for rotation under the bias of spring 364. Cam surface 370 of lever 360 abuts against end 338 of slide 330, forcing slide 330 in an upward direction and freeing firing spring 314 by raising it above the end of wire 316. Firing spring 314 impinges upon the igniter tube of the percussively fireable flash unit, thereby causing ignition of the flash unit. Simultaneously, striker 366 of lever 360 impinges upon piezoelectric crystal 354, thereby generating a voltage pulse which is coupled through transformer 352 is electrical contacts 350. In the absence of a piezoelectrically fireable flash unit in socket 310, this voltage pulse is ineffective. Should the operator desire to fire a piezoelectric flash unit, as well as the percussive unit, the piezoelectric fireable flash unit would be inserted to socket 310 and the voltage pulse generated and transmitted to contacts 350 would be operable to fire the electrically fired flash unit simultaneously with the percussive unit in socket 308.

Should the operator desire to fire only a piezoelectrically fireable flash unit, no flash unit would be inserted in socket 308 while a piezoelectrically fireable flash unit would be inserted in socket 310. Lever 320 would remain in its clockwise position under bias of spring 324 and thereby hold slide element 330 in its downward position. Upon actuation of the cable release, lever 380 would rotate in a clockwise direction thereby freeing lever 360 for movement under the bias of spring 364. Striker element 366 impinges upon piezoelectric crystal 354, thereby generating a voltage pulse for transmission through transformer 352 to electrical contact 350, causing ignition of the flash unit in socket 310. Simultaneously, cam surface 370 passes over end 338 of slide 330 which has been held down by lever 320. The adapter may thus be used to fire either a percussively fireable or an electrically fireable flash unit singly, or both percussively and electrically fireable flash units simultaneously.

The adapter illustrated in FIG. 7 is usable in conjunction with a camera which incorporates an X-contact switch used to fire a flash unit. An adapter 400 includes a housing 402 and a plug-in base 404, which is connected into the electrical circuit of the camera as adapter 400 is mounted on the camera. One terminal of the camera circuit is connected through plug-in base 404 to one terminal of a battery 406 within adapter 400. The second terminal of battery 406 is connected to an armature 408 of an electromagnet 410 within adapter 400. The electrical circuit is completed by connecting the armature 408 back to the second terminal of the camera electrical circuit through plug-in base 404.

Adapter 400 includes a socket 420 for use with a percussively fireable flash unit and a socket 450 for use with a piezoelectrically fireable flash unit. Socket 420 has a downwardly depending finger 422 associated therewith. The firing mechanism of socket 420 includes a firing spring 424 releasably held by a fixed wire 426. Movement of spring 424 above the end of wire 426 frees spring 424 for movement against the primer tube of a flash unit in socket 420.

Lever 428 is biased in a clockwise direction by a spring 430 which is held between an arm 432 on lever 428 and a fixed pin 434. Lever 428 abuts against a fixed pin 442 carried on a slide 440, which is axially aligned with an aperture 444 in the top surface of adapter 400. Slide 440 is urged in an upward direction by a spring 446 but is held in its downward position by lever 428 until a flash unit is inserted in socket 420, thereby moving finger 422 and freeing slide 440 for upward movment until it comes to rest upon spring 424.

Socket 450 has a pair of electrical terminals 452, which are coupled through a transformer 454 to a piezoelectric crystal 456. A striker lever 460 is rotatably mounted on a pin 462 and is biased by a spring 464 so that a striker 466 carried by lever 460 abuts against piezoelectric crystal 456. Striker lever 460 is held in its cocked position by a catch member 472 of a release lever 470 which is positioned adjacent to but separated from armature 408 of electromagnet 410. Striker lever 460 also has an integral arm 468 which terminates in a cam surface 469 positioned adjacent to a lower end 495 of slide 440.

In operation, a percussively fireable flash unit is inserted in socket 420, thereby causing depending finger 422 to move downwardly and rotating lever 428 against the bias of spring 430. Slide 440 is thereby freed for upward movement under the bias of spring 446 until slide 440 abuts on firing spring 424. Actuation of the camera shutter mechanism now closes the X-contact switch within the camera, thereby completing the circuit within the adapter through battery 406 and armature 408 of electromagnet 410. Lever 470 is thereby moved upward under urging of the electrical field of armature 408 removing catch member 472 from its engaging position with lever 460. Lever 460 rotates under the bias of spring 462, thereby causing cam surface 469 to contact end 495 of slide 440 urging it in an upward direction and freeing firing spring 424 of socket 420 from wire 426 for actuation of the flash unit. Simultaneously, striker 466 is urged against piezoelectric crystal 456 but the voltage pulse generated and transmitted to contacts 452 is ineffectual in the absence of a flash unit within socket 450. Should the operator desire to simultaneously fire a piezoelectrically fireable flash unit and a percussively fireable flash unit, insertion of a piezoelectrically fireable flash unit in socket 450 will insure the simultaneous firing of both flash units. Should the operator desire to fire only a piezoelectrically fireable flash unit, such a unit is inserted in socket 450 with no flash unit being inserted in socket 420. Lever 424 then remains in its blocking position, by which slide 440 is held in its downward position within adapter 400. Actuation of the camera shutter mechanism thereby closes the electrical circuit within the adapter through battery 406 and armature 408 of electromagnet 410, causing movement of lever 470 in an upward direction. Lever 460 is then free for rotation under the bias of spring 464, bringing striker 466 into engagement with piezoelectric crystal 456. The voltage pulse generated by piezoelectric crystal 456 is transmitted through transformer 454 to electrical contacts 452, thereby causing ignition of the flash unit held within socket 450. Cocking of lever 460 can be effected manually by a cocking lever, not shown, externally accessible to the adapter user.

The adapter illustrated in FIG. 8 is for use with a camera which has no internal photoflash capability. An adapter 500 consists of a housing 502 with a mounting foot 504 which is positionable within an accessory shoe on the camera. Adapter 500 has a socket 506 for use with a percussively fireable flash unit and a socket 508 for use with a piezoelectrically fireable flash unit. Socket 506 has a downwardly depending finger 510. The firing mechanism of socket 506 includes a firing spring 512 releasably held by a fixed wire 514. Movement of spring 512 above the end of wire 514 frees spring 512 for movement against the primer tube of a flash unit in socket 506.

A lever 516 is rotatably mounted on a fixed pin 518 and is urged in a clockwise direction under the bias of a spring 520. Lever 516 abuts against a fixed pin 524 on a slide element 522 and thereby holds slide 522 in its downward position against the bias of a spring 526. An end 528 of slide 522 is positioned adjacent to a cam surface 532 on a striker lever 530. Striker lever 530 is rotatably mounted on a pin 534 and is biased by means of a spring 536 so that a striker 538 is urged against a piezoelectric crystal 540. Piezoelectric crystal 540 is connected to a transformer 542, with a voltage pulse from crystal 540 being transmitted thereby to a pair of electrical contacts 544 within socket 508.

A release lever 550 is rotatably mounted on a pin 552 and is urged in a clockwise direction by a spring 554 which is held between an ear 556 on lever 550 and housing 502 of adapter 500. An ear 558 of lever 550 abuts against striker lever 530 and holds striker lever 530 in its cocked position. An ear 560 of lever 550 is positioned in axial alignment with an aperture 562 in housing 502, which terminates in a cable socket 564.

In operation, a percussively fireable flash unit is inserted in socket 506 thereby causing downward movement of finger 510 and counterclockwise rotation of lever 516 against the bias of spring 520. Slide 522 is thereby freed for movement upward under the bias of spring 526 until the end of slide 522 rests upon firing spring 512 of socket 506. Actuation of the flash unit by a cable release inserted in socket 564 causes rotation of a lever 550 in a counterclockwise direction, thereby moving ear 558 away from lever 530 and freeing lever 530 from rotation under the bias of spring 536. Cam surface 532 of lever 530 now forces slide 522 upwardly, thereby freeing firing spring 512 for engagement with the primer tube of a flash unit held within socket 506. Simultaneously, striker 538 impinges upon piezoelectric crystal 540 thereby generating a voltage pulse which is transmitted through transformer 542 to terminals 544. Should the operator desire to ignite a piezoelectrically fireable flash unit simultaneously with the percussively fireable flash unit, the piezoelectrically fireable flash unit would be inserted within socket 508 and the voltage pulse would ignite the flash unit in socket 508 and simultaneously with ignition of the flash unit in socket 506. Should the operator desire to fire only a piezoelectrically fired flash unit, such a unit would be inserted within socket 508 with no unit inserted within socket 506. Lever 516 thereby remains in its clockwise blocking position holding slide 522 in its downward position. Actuation of release lever 550 by the cable release frees lever 530 for rotation under the bias of spring 534. Striker 538 thereby abuts on crystal 540, with cam surface 532 passing above end 528 of slide 522, producing a voltage pulse which is transmitted through transformer 542 to terminals 544 causing ignition of the piezoelectrically fireable flash unit held within socket 508. Cocking of lever 530 can be effected manually by a cocking lever, not shown, externally accessible to an operator.

The invention has been described in detail with particular reference to the preferred embodiments thereof, but it will be understood that variations and modifications can be effected within the spirit and scope of the invention. In particular, it is to be noted that the single unit sockets illustrated in the disclosed embodiments may be replaced by multiple unit sockets with associated indexing means which is well known in the art. In addition, any well known means for cocking of the firing slide or release levers of the disclosed embodiments may be incorporated within those embodiments.

We claim:

1. Photographic apparatus comprising:
   means for receiving a percussively actuable flash unit;
   means for actuating said percussively actuable flash unit in response to the application of a mechanical force;
   means for receiving a piezoelectrically actuable flash unit;
   piezoelectrical means for actuating said piezo-electrically actuable flash unit in response to the application of mechanical force; and
   means for applying mechanical force to both of said actuating means.

2. Apparatus as in claim 1, further including a control member movable between a first position wherein said member disables said percussive actuating means and a second position wherein said member disables said piezoelectrical actuating means, said member being movable to said second position in response to insertion of a percussively actuated flash unit in said percussive receiving means.

3. Apparatus as in claim 2, said apparatus further comprising override means for enabling said piezoelectrical actuating means to actuate a piezoelectrically actuable flash unit when said member is in said second position.

4. Photographic apparatus comprising:
   means for receiving a flash unit of a first type having at least one lamp fireable by the application of mechanical force to the unit;

an electrical circuit including electromechanical transducer means for generating electrical potential in response to an applied force;

means for receiving a flash unit of a second type having at least one lamp electrically ignitable, said receiving means including means for connecting such a received unit in said electrical circuit;

force applying means having a first condition in which said means is adapted to apply a force directly to a received unit of the first type and a second condition in which said means is adapted to apply a force to said electromechanical transducer means; and means for adjusting said force applying means between its first and second conditions.

5. Photographic apparatus according to claim 4, wherein said means for adjusting said force applying means includes means for adjusting said force applying means between said first and second conditions in response to receipt of a flash unit in one of said receiving means.

6. Photographic apparatus according to claim 4, wherein said force applying means is adjustable to a third condition in which it is adapted to apply a mechanical force both directly to a flash unit of the first type and to said electromechanical transducer means substantially simultaneously to fire a received lamp unit in both receiving means.

7. For use with flash units of a first type having at least one flash lamp fireable by striking and a striker for each such lamp held in a pre-energized position from which it is releasable to effect such striking and flash lamp units of a second type which are adapted to be fired by application of electrical potential; photographic apparatus comprising:

means for receiving a flash unit of the first type and for orienting such a unit with the pre-energized striker thereof in a predetermined position;

means for sensing the presence or absence of a striker in said predetermined position;

means for receiving a flash unit of the second type;

electrical circuit means actuable to apply an electrical potential to a received unit of the second type;

actuating means having a first condition in which said means is adapted to actuate a lamp of the first type received in its receiving means and a second condition in which said means is adapted to actuate said electrical circuit; and means responsive to sensing of the absence of a pre-energized striker in said predetermined position for adjusting said actuating means to its second condition.

8. Photographic apparatus according to claim 7, wherein said electrical circuit means includes electromechanical transducer means for generating an electrical potential in response to an applied force and wherein said actuating means includes means for applying a force to said electromechanical transducer means when said actuating means is in its second condition.

9. Photographic apparatus comprising:

first receiving means for receiving a flash unit of a first type having at least one lamp fireable by the application of mechanical force directly to the unit;

an electrical circuit including electromechanical transducer means for generating electrical potential in response to an applied force;

second receiving means for receiving a flash unit of a second type having at least one lamp electrically ignitable, said second receiving means including means for connecting a received unit in said electrical circuit;

means for transmitting an applied force to a received flash unit of the first type;

drive means movable through an operative path into force applying engagement with said electromechanical transducer means, said drive means including means for applying a force to said force transmitting means during movement through said operative path; and blocking means for preventing movement of said drive means into contact with said electromechanical transducer means in response to receipt of a flash unit of the first type in said first receiving means.

10. Photographic apparatus comprising:

first receiving means for receiving a flash unit of a first type having at least one lamp fireable by the application of mechanical force directly to the unit;

an electrical circuit including electromechanical transducer means for generating electrical potential in response to an applied force;

second receiving means for receiving a flash unit of a second type having at least one lamp electrically ignitable, said second receiving means including means for connecting a received unit in said electrical circuit;

means for transmitting an applied force to a flash unit of the first type, said means having an impact receiving surface movable from a first position to a second position in response to receipt of a flash unit in said receiving means;

drive means movable through an operative path to apply a force to said electromechanical transducer means and to said impact receiving surface when said surface is in its second position but to miss said surface when said surface is in its first position.

11. Photographic apparatus comprising:

first receiving means for receiving a flash unit of a first type having at least one lamp fireable by the application of mechanical force to the unit;

an electrical circuit including electromechanical transducer means for generating electrical potential in response to an applied force;

second receiving means for receiving a flash unit of a second type having at least one lamp electrically ignitable, said second receiving means including means for connecting a received unit of the second type in said electrical circuit; and means for applying force to said electromechanical transducer means and to a received flash unit of the first type at substantially the same time.

12. Photographic apparatus comprising:

first receiving means for receiving a flash unit of a first type having at least one lamp fireable by the application of mechanical force to the unit;

an electrical circuit including electromechanical transducer means for generating electrical potential in response to an applied force;

second receiving means for receiving a flash unit of a second type having at least one lamp electrically ignitable, said second receiving means including means for connecting a received unit in said electrical circuit; and drive means mounted for movement to apply force to said electromechanical transducer means and to a received flash unit of the first type.

13. Photographic apparatus according to claim 12, wherein said drive means includes means for applying force to a received flash unit of the first type and to said electromechanical transducer means substantially simultaneously.

14. Photographic apparatus according to claim 12, wherein said drive means has a first condition in which it is adapted to apply a force to a received flash unit of the first type and a second condition where it is adapted to apply a force to said electromechanical transducer means and wherein said photographic apparatus further includes means for adjusting said drive means between its first condition and its second condition.

15. Photographic apparatus according to claim 12, wherein said apparatus includes:

means for holding said drive means in an energized position from which it is releasable for said force applying movement; and means for releasing said drive means from said holding means.

16. Photographic apparatus according to claim 15, further including:

a housing;

support means on said housing for attachment of said photographic apparatus to a camera of the type having a flash actuating means; and means for operatively connecting said releasing means of said apparatus with the flash actuating means of the camera.

17. Photographic apparatus according to claim 16, wherein said connecting means includes electrical circuit means connectable to a synchroflash circuit of the camera and said releasing means includes electromagnetic means for releasing said holding means.

* * * * *